Aug. 3, 1926.
W. A. NOEL
1,594,549
METHOD OF AND APPARATUS FOR DRYING AND CONDITIONING MATERIALS
Filed Jan. 23, 1926
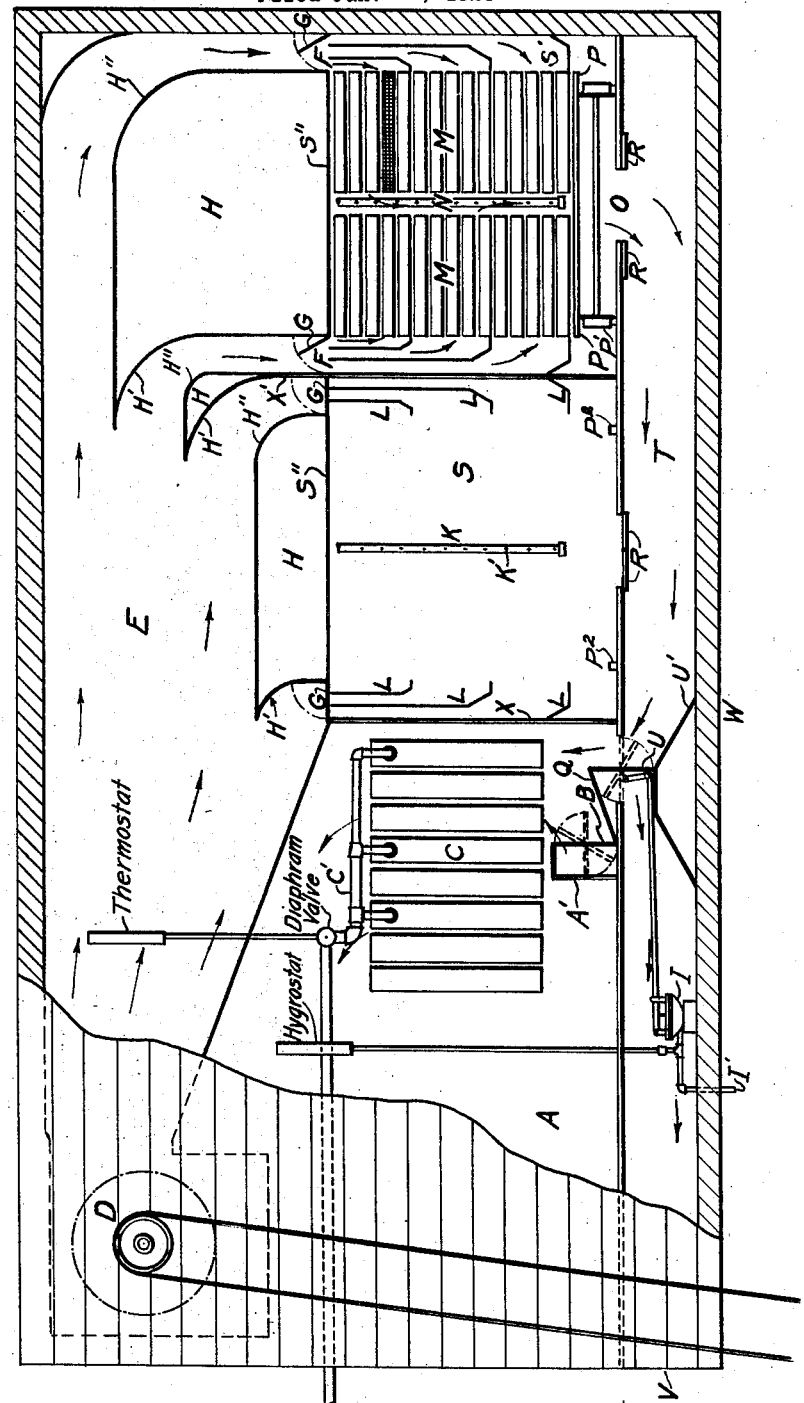

Patented Aug. 3, 1926.

1,594,549

UNITED STATES PATENT OFFICE.

WILLIAM A. NOEL, OF WASHINGTON, DISTRICT OF COLUMBIA.

METHOD OF AND APPARATUS FOR DRYING AND CONDITIONING MATERIALS.

Application filed January 23, 1926. Serial No. 83,348.

This invention relates to the art of dehydration of food products or other substances. It relates more particularly to a method and apparatus for processing and drying food products such as fruits and vegetables although its usefulness is not confined to the treatment and dehydration of food products. Among other uses of the invention, may be mentioned the drying and seasoning of lumber and other building materials.

A general object of the invention is the attainment of a method and apparatus for dehydration of high efficiency especially in respect to uniformity of drying of the products and of low operating costs.

It is standard practice in dehydration methods and apparatus to first subject the fruit, vegetables or other food products undergoing treatment, to the action of a vapor of high density, temperature and humidity, such for example as steam, for the purpose of blanching the material before subjecting it to the dehydrating process. This preliminary processing presents two important results, (1) the inactivation of the enzymes or other organisms which might otherwise set up processes in the final product unfitting for use and (2) the preconditioning of the material by the application of heat and moisture thereto so as to prevent that surface drying and hardening known as "case-hardening" which otherwise occurs during the application of the drying medium and which prevents the extraction of the moisture from the interior parts of the material. Practically all dehydrating apparatus provide a passageway or a series of passageways for the flow or circulation of the drying medium over the material to be dried, and for the most effective preliminary processing of the material, the blanching is generally carried out in a chamber closed from the general circulatory system during the blanching operation. In all dehydration methods and apparatus heretofore known and used, so far as I am aware, the steam used for blanching has either been exhausted direct from the blanching chamber to the atmosphere and entirely wasted or, in some cases, notably in tunnel driers, has been caused to flow once through the tunnel or drying passage, into which the product is delivered from the blanching chamber, and then exhausted to the atmosphere.

Accordingly, a particular object of the present invention is the continued use in the drying process, after the blanching step is over, of proper proportions of the blanching steam, mixed with air or other drying medium, thus conserving in the entire drying system the heat initially provided for the blanching process and materially reducing the cost of operation.

Another and closely associated object is the utilization of the entire body of the blanching steam in bringing the entire apparatus up to a temperature suitable for the beginning of the drying process proper.

Still another particular object of the invention is the utilization of the blanching steam for conditioning the drying medium in respect to its temperature and humidity.

Other particular objects of the invention relate to insuring uniformity of drying of products or articles exposed in large quantities, that is to insuring uniformity of drying over the entire lot. Considerable difficulty has been experienced in the art as practiced heretofore in obtaining this uniformity of drying especially in that type of modern drier known as the compartment type in which a plurality of drying chambers are provided extending in a series along a common supply chamber or passage delivering the air or other drying medium to the chambers and in which chambers the products to be dried are placed on superposed trays. The greatest difficulty in obtaining uniform drying in the type of apparatus referred to has been due to unequal distribution of the drying medium from the common supply passage or chamber to the various drying chambers. Attempts have heretofore been made to overcome this unequal distribution of air to the drying chambers by tapering the common supply passage along the series of drying chambers with the passage diminishing in cross sectional area toward the end chamber and by placing a series of dampers in that supply passage, one adjacent the inlet to each drying chamber. While these arrangements have tended to a more uniform distribution of the drying medium to the various drying chambers, certain considerations in respect thereto indicate that complete or substantial uniformity in the distribution of the drying medium to the drying chambers, particularly in respect to density and heat units of the medium delivered, has not been attained. This is due in major part to the effect of the dampers on the air or other drying vapor blowing along the supply passage and to the uncertainty, if not in fact impossibility, of setting the dampers to those precise degrees of opening under different velocities and densities of vapor flow required to deliver the drying vapor in volumes of equal densities and degrees of heat to the chambers of the series. Assume, for example, that there are three drying chambers in the series and three dampers in the common supply passage, each chamber thus requiring one third of the vapor flow at a pressure or density and with heat units equal to those of the vapor flow into each of the other chambers. The dampers if all set one third open will not insure the uniformity indicated; for, assuming that the first damper of the series delivers the required one third flow to the first chamber of the series, the second damper will deliver but one third of the remainder instead of one third of the entire flow, and so on; and, as is apparent, it is difficult, if not in fact impossible, to determine what precise degree of different relative openings of the dampers of the series would be required to insure the equal distribution referred to. Moreover, the body of vapor not entering the first chamber but passing the damper thereto immediately expands if the supply passage continues of uniform cross section, this expansion altering of course the density and heat units per volume of the drying medium, and while this is corrected to some extent by the tapering form of supply passage, it has been found impossible to exactly proportion that taper, particularly in relation to the variable operation of the dampers, to insure the distribution of the drying medium to each chamber uniform in density and heat units.

Accordingly, a further particular object of the invetnion is to provide in a dehydrating apparatus of the compartment type referred to, means for delivering to the drying chambers from the common supply passage volumes of the drying medium all equal in density and heat units.

The foregoing and other objects of the invention as well as the principles thereof will more fully appear from the examples hereinafter given of the novel method of dehydration and from the description hereinafter given of a concrete embodiment of the novel apparatus. It is to be understood, however, that the examples and embodiment referred to are merely illustrative and that within the broad scope of the invention and as defined in the appended claims are included other specific examples of the method and other specific embodiments of the apparatus.

The single figure of the drawing accompanying and forming a part of this specification presents in more or less diagrammatic form the concrete embodiment of the novel apparatus here chosen to illustrate the principles of the apparatus features of the invention. The drawing shows a side elevation of the apparatus with the doors and a portion of the front wall omitted to show in more or less diagrammatic form the interior arrangement of drying chambers, material-supplying trays therein, associated supply and discharge passages, fan and heating unit.

The apparatus shown in the drawing comprises a housing W closed at the top and bottom and on the four sides except for the ingress thereto to be had through the usual type of doors used in such apparatus and except for the vapor discharge opening later to be referred to.

The interior of the housing is divided by suitable partition and interior walls into a series of dehydrating chambers in which the products to be treated are properly supported, these chambers also being of a construction adapting them to receive and retain an initial steam supply for the preliminary blanching process, a supply passage extending along the series of dehydrating chambers for the supply of the dehydrating vapors to the dehydrating chambers after the blanching process is over, a vapor inlet and conditioning chamber antecedent to and supplying the dehydrating vapors to the supply passage, and a vapor discharge passage extending along the series of dehydrating chambers.

A plurality of dehydrating chambers are not absolutely essential to the realization of certain of the broader aspects of the invention, such as the preliminary steam blanching of the material and the subsequent utilization of ths steam to condition the air or other drying medium, although several drying chambers are preferably employed. The number and dimensions of the dehydrating chambers will depend upon the use for which the apparatus is built. For the drying of large products or articles, like lumber for instance, the drying chambers will be made of substantially greater dimensions than where the apparatus is built for use in the dehydration of food products such as fruits and vegetables. The illustrative embodiment of the apparatus is intended for the drying of food products. Generally in such an apparatus a series of about six dehydrating chambers are employed, although as already stated, the number of such chambers may be greater or less than that depending upon the designed capacity of the apparatus. In the illustrative apparatus, two dehydrating chambers S and S' are shown, with the supply passage E for the dehydrating vapors extending above the series of dehydrating chambers and the vapor discharge passage T extending below them to a vent V outside the housing W.

Each dehydrating chamber is provided in its upper wall or top S" with two pivoted closure members or small doors G arranged at opposite sides of the chamber top, each closure member G and the opening F into the chamber controlled thereby preferably extending the entire width of the chamber, that is transversely to the housing W. These pivoted members G are operated from outside the housing W by suitable rod and crank mechanism and when in their upward pivoted position as shown in connection with the chamber S', they open communication between the vapor supply passage E and the chamber and when in their closed positions as shown in connection with chamber S, they close off the chamber from the supply passage E.

Each bleaching and dehydrating chamber is also provided with a discharge port O in its lower wall or bottom communicating with the discharge passage T, that port being controlled by the sliding valve or door R, operated likewise from the exterior of the housing W.

With the members G and R in the open position shown in connection with chamber S', it is obvious that there may be a flow of vapors from the supply passage E, through the chamber and out the port O to the discharge passage T. With the members G and R in their closed positions as shown in connection with chamber S, it is obvious that the chamber is closed from both the supply passage E and the discharge passage T. In this latter closed condition, the chamber may be used and is intended to be used as a blanching chamber, the steam for the blanching process being admitted through the pipe K, perforated as shown at K'.

The doors in the housing W, not shown in the drawing, are doors to the chambers S and S', and when opened, enable the running of a truck P having wheels P' into the chamber upon a track P², as shown in connection with chamber S'. The truck P is provided with a suitable upstanding framework to support the trays M in two spaced columns or stacks, with the trays in each stack spaced as shown. Preferably the trays M are made wholly of wire with no obstructing side framework behind which particles of the material spread thereon may be shielded from currents of air or other vapors passing through the chamber.

The air inlet and conditioning chamber of the apparatus is shown at A. Extending transversely of this chamber immediately adjacent its lower wall or bottom is an air inlet conduit A', rectangular in cross section as shown, and having in one of its side faces, a rectangular shaped opening controlled by the pivoted damper B. With the damper B entirely closed, as shown in full lines, the inlet chamber A is closed from direct communication with the atmosphere and no fresh supply of air is admitted to that chamber. The dotted lines indicate full and partial open positions of the damper providing for varying quantities of fresh air to the chamber A.

The chamber A is provided with a heater C immediately above the air inlet conduit A'. This heater may be of any suitable type adapted to heat the vapors passing over it. Preferably, and as shown, it is a steam radiator having spaced heating units supplied with steam from the steam line C', the steam supply, and consequently the degree of heat imparted to the vapors in chamber A, being controlled by a thermostat located in the vapor supply passage E and operating the diaphragm valve in the steam line in the manner well known in the art of thermostat valve control.

By the heater C, with its thermostatic control, the vapors in chamber A which are to be delivered to the supply passage E and from thence to the drying chambers, are conditioned in respect to the heat units thereof. As hereinbefore stated, one of the objects of the invention is to also condition the drying medium by means of the steam used in blanching. To enable this to be done, means are provided for admitting vapors from the discharge passage T to the inlet chamber A. The discharge passage T is provided with a port communicating with the inlet chamber A, the port being controlled by the damper U. A deflector U' is arranged on the bottom wall of the discharge passage T in such position, as shown, that when the damper U is in full open position, shown in the full lines, all the vapors in the passage T are discharged into the inlet chamber A instead of to the atmosphere through the vent V. Preferably, although not necessarily, the dampers B and U are operatively coupled as diagrammatically indicated by the line Q on the drawing, the arrangement being such that when the damper U is fully open, the damper B is fully closed, thus causing the exclusion of fresh air to the inlet chamber A and the admission thereto of the vapors from the discharge passage T only. As also shown, the arrangement provides a full closing of the damper U, as shown in dotted horizontal lines, and a coordinate full opening of the damper B, or intermediate positions of partial opening of both dampers, so that fresh air only may be admitted to chamber A or both fresh air and vapors from passage T, to intermingle before passing on to the supply passage E by way of the fan D.

Obviously, the vapors admitted to the inlet chamber A from the discharge passage T may be either the steam used in the blanching process and that only or a mixture of steam and air recirculating through the system, or air only which has recirculated through the system. In any of these cases, the vapors passing from the discharge passage T into the inlet chamber A will have a greater moisture content than the fresh air initially used, and hence such vapors can be used to condition the fresh air entering the inlet chamber A as to its moisture content, this conditioning being of course also dependent upon the degree of heat imparted to the vapors by the heater C since the higher the temperature of the vapors the greater their moisture absorptive powers.

To provide for certainty of attainment of the desired moisture content of the vapors by the vapor conditioning process going on in inlet chamber A, the dampers B and U are automatically controlled by a hygrostat control, well known in the art. The hygrostat is indicated on the drawing as located in the inlet chamber A and as controlling a damper actuating motor I, operating by compressed air from the air line I'.

As hereinbefore stated, one of the primary objects of the invention is to produce a uniform distribution of the drying vapors from the vapor supply passage to the various drying chambers and with the vapors delivered to those drying chambers of equal density and temperature for all the chambers. In attaining that object, the present invention dispenses with dampers in the air supply passage with their uncertainty of operation in delivering the desired quantities and pressures of vapor, and provides instead what may be termed sluice-means producing in effect separate and distinct flows of the vapor into each drying chamber from the common supply passage and with no one flow affecting the pressure or vapor density of the other flows.

In the present illustrative embodiment of the invention the sluice-means takes the form of bodies H mounted on the tops S'' of the drying chambers and on an extension X' of the partitions between the drying chambers.

These bodies H may conveniently be made of thin metal sides to form a closed obstructing body of the forms shown. They extend transversely of the housing W and the supply passage E, the entire width of that housing and passage. Each body has an anterior curved face, H', directly in the path of the onflowing stream of vapors and adjacent the rear edge of the entrance port F of the drying chambers, and a flat horizontal top extending toward the next rearward body of the series and terminating in a curved end or rear face H'' cooperating with the anterior face H' of the next rearward body of the series to form an entrance or sluice-way to the port F between them. The bodies are also stepped up in height along the series as shown so as to diminish the cross-sectional area of the air supply passage to correspond to the quantity of vapor flow along the series without alteration of the pressure or vapor density. If, for example, the height of the air supply passage, just in from the first body H, is four feet, and the first body H is one foot in height, the next rearward body H will be made two feet in height and the next rearward one three feet. The front deflector face H' of the first body H will then take from the overflowing vapor stream a portion of the flow corresponding to the extent of projection of that body into the vapor stream and will deliver the separated flow through the front port F of the first drying chamber. That delivery of vapor will not, however, affect the density of the stream flowing on over the top of the first body H because the supply passage has been reduced in exact correspondence to the body of vapor sliced off, so to speak, from the main stream. In like fashion the next rearward body projects into the remaining vapor stream the exact height that the first one projected into the initial stream and this rearward body takes from the stream the same quantity of flow which the first one took, and the flow remaining is undiminished in density or pressure because it passes through a properly reduced portion of the supply passage on to the next sluice way.

As shown in the drawings, the vapors from the supply passage E are delivered to the drying chambers through opposite ports F in the top of those chambers. To direct the drying vapors across the trays M, stationary guides or vanes L are provided with their forward ends directly in the path of vapor flow into the chamber through the ports F, these vanes extending downwardly of the chamber on two opposite sides thereof with terminals at different levels bent to a horizontal direction to direct the vapor flow transversely across the trays M, the stream traversing the trays from opposite directions then meeting in the central space N between the two stacks of trays and discharging downwardly through the discharge aperture O into the discharge duct T.

The apparatus thus described is one which may advantageously be used in carrying out the method features of this invention.

The products to be processed and dehydrated having been placed in trays M upon the trucks P and the loaded trucks run into the chambers, the chambers are completely closed and steam in the required quantity and under the required pressure for blanching is introduced through the perforated pipes K and the products subjected to such steam for the required time to complete the blanching process. The trucks loaded with the products are then still left in the chambers until the dehydrating is performed. Any of several different procedures may then be resorted to in properly conditioning the drying medium for dehydration of the products. Before fresh air is introduced at all into the system, the steam used for blanching may be further utilized to warm up the entire apparatus. For this purpose, the chamber closures G and R are opened, and the damper U turned to the position shown in full lines in the drawing, and, with or without operation of the fan D, the steam is allowed to escape and to flow through the various chambers and passages of the apparatus. Repeated and rapid circulation of the steam in recurring cycles from the drying chambers, through the discharge duct T, the vapor inlet chamber A, along the supply passage E and back into the drying chambers, can be had by operation of the fan.

Upon opening the damper B for supplying fresh air for drying, this air may be conditioned in the inlet chamber A to the degree of temperature and relatively high humidity required for beginning the dehydration process by the whole or a portion of the steam used in blanching. If the blanching chambers have first been opened and the steam therefrom circulated through the system of the apparatus before any fresh air is admitted, the dampers B and U may be partially opened and part of the steam exhausted from the system through the discharge duct T to the outer vent V, while part continues to enter the inlet chamber A, to mingle with the fresh air entering through the partly open damper B. Or, the dampers U and B may be partly opened before opening the blanching chambers to release the steam therein and then, with the fan going, the steam will be drawn from the blanching chambers through the discharge duct T, part escaping through the vent V and part entering the inlet chamber A to condition the air entering therein. At the same time, if required, steam will be turned on to the heater C and the mixture of air and steam heated to the required temperature. The thermostat and hygrostat may, of course, be adjustably set, and by such controls of the heater and dampers certainty of any required temperature and humidity conditions in the circulatory vapors used for drying may be attained throughout the entire drying process. For example, at the beginning of the drying when a relatively high temperature and humidity is required, the thermostat and hygrostat may be set for these conditions. A substantial proportion of the steam first used in blanching will then be admitted through the damper U to the inlet and conditioning chamber A to mingle with the fresh air entering through the damper B, the two vapors will be intimately mixed in the chamber A and in passing through the fan D and will flow on through the supply passage E and into and through the drying chambers, over the material exposed on the trays therein, then through the discharge duct T, a portion being vented to the atmosphere and the remainder entering the chamber A to take part in the recirculation. If during this recirculation, the humidity drops too low due to a venting of a portion of the recirculating fluids through the vent V, the hygrostat will move the damper U to full line position to recirculate all the vapors and the damper B to prevent ingress of fresh air, until by reason of the continued recirculation and repeated passage of the vapors over the material, the humidity of the vapors rises too high for effective drying, when the hygrostat control will move the dampers in the opposite direction to vent some of the recirculating vapors to the atmosphere and admit fresh air of lower humidity.

During the last stage of the drying when a relatively lower humidity is required, the hygrostat may again be set to prevent all recirculation and admit only fresh air for one passage only over the materials being dried, if it be found that this provides the proper conditions in the drying medium.

What I claim is:—

1. The method of treating and dehydrating food products and the like comprising exposing the products upon suitable supports in a chamber, introducing steam alone into said chamber for blanching, then after blanching causing said steam to flow out of said chamber and into a confined body of air to condition said air as to humidity and then introducing said air into said chamber to dry said products.

2. An apparatus for blanching and dehydrating food porducts and the like comprising, in combination, a chamber in which the products are located and adapted for the reception and retention of steam for blanching, means for supplying to said chamber the steam for blanching, an air inlet and conditioning chamber and air supply means therefor, means for exhausting steam from said first mentioned chamber and delivering the whole or a portion of the same to said second mentioned chamber to mingle with the air in said second mentioned chamber, and means for causing a flow of the mingled air and steam to and through said first mentioned chamber to dry the products therein.

3. An apparatus for blanching and dehydrating food products and the like comprising, in combination, a blanching and drying chamber in which the products are located and adapted for the reception and retention of steam for blanching, steam supply means to said chamber, an air inlet and conditioning chamber, a vapor supply passage extending from said air inlet and conditioning chamber to said blanching and drying chamber, a vapor discharge duct extending from said blanching and drying chamber to said air inlet and conditioning chamber and having an atmospheric vent, damper means controlling the flow of vapor through said discharge duct to said air linlet chamber and to said atmospheric vent, and a hygrostat control device subject to the humidity conditions in said air inlet chamber and controlling said damper means.

4. A dehydrating apparatus comprising in combination, a series of dehydrating chambers and means for suitably supporting therein the products to be dehydrated, a common vapor supply passage communicating with said chambers, and means for delivering the drying vapors in uniform volumes and densities from said supply passage to said chambers, said means comprising a series of deflectors adjacent the communications to said chambers from said supply passage and extending into said supply passage distances progressively increasing along the series in the direction of the end chamber.

5. A dehydrating apparatus comprising, in combination, a series of dehydrating chambers and means for suitably supporting therein the products to be dehydrated, a common vapor supply passage communicating with said chambers, and means for delivering the drying vapors from said supply passage to said chambers in uniform volume and density for each chamber, said means comprising a series of deflectors extending from said chambers into the vapor supply passage distances progressively increasing along the series of chambers toward the end chamber.

6. A dehydrating apparatus comprising, in combination, a series of dehydrating chambers and means for suitably supporting therein the products to be dehydrated, a common vapor supply passage communicating with said chambers and a series of deflectors mounted on said chambers adjacent the communications to said chambers from said supply passage and diminishing the cross sectional area of said supply passage in step-up stages toward the end chamber of the series.

7. A dehydrating apparatus comprising, in combination, a longitudinally extending series of dehydrating chambers and means for suitably supporting therein the products to be dehydrated, a common vapor supply passage extending longitudinally of the series of chambers, said chambers each having an inlet port communicating directly with said vapor supply passage, and a series of deflectors for said chambers, mounted thereon each rearwardly adjacent an inlet port and extending into said supply passage increasing distances in step-up stages toward the end chamber of the series, said deflectors having body conformations producing decreased cross-sectional areas of the vapor passage from one inlet port to the next along the series toward the end inlet port.

8. A dehydrating apparatus comprising, in combination, a longitudinally extending series of dehydrating chambers, a common vapor supply passage for supplying the drying vapors to said chambers and sluice ways receiving flows of vapor from said passage and delivering the same to said chambers, said sluice ways having entrance mouths in said passage located wholly in different planes transversely of the line of vapor flow through said passage.

9. A dehydrating apparatus comprising a dehydrating chamber and rack-means therein supporting a stack of trays, said chamber having a vapor inlet port adjacent one side thereof and to one side of said stack of trays and a plurality of guide vanes having free ends positioned in spaced relation in said inlet port, said guide valves extending from said inlet port to different distances along said stack of trays and having inner terminals directed toward said trays from one side thereof.

WILLIAM A. NOEL.